W. G. CANION.
ECONOMY AIR BRAKE APPARATUS.
APPLICATION FILED DEC. 2, 1913.
1,149,152.
Patented Aug. 3, 1915.
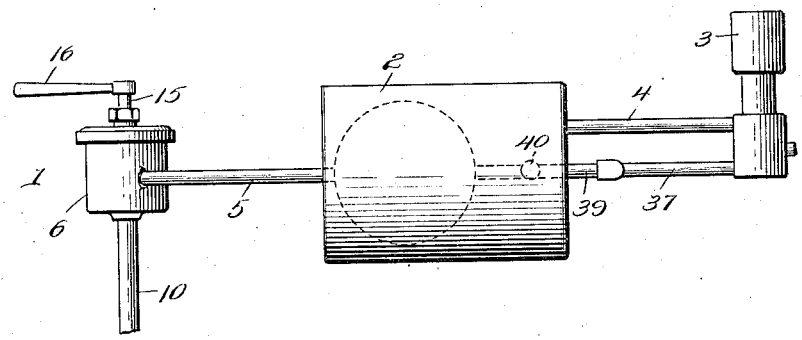
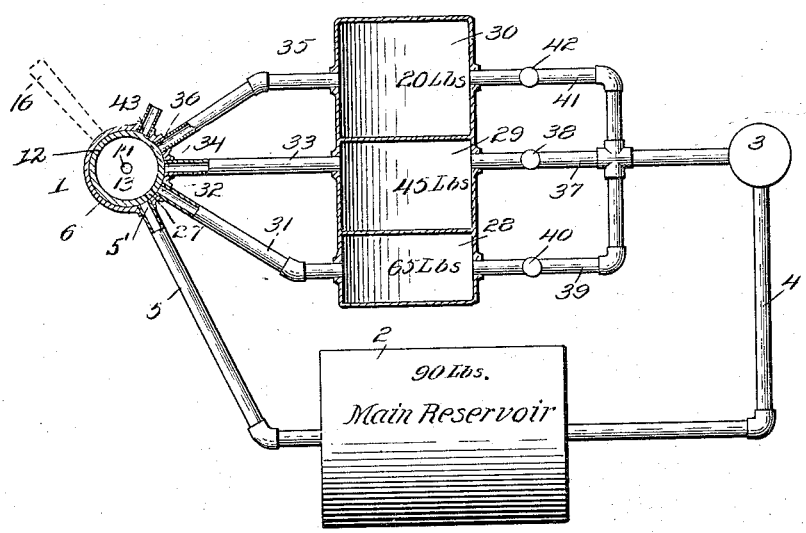

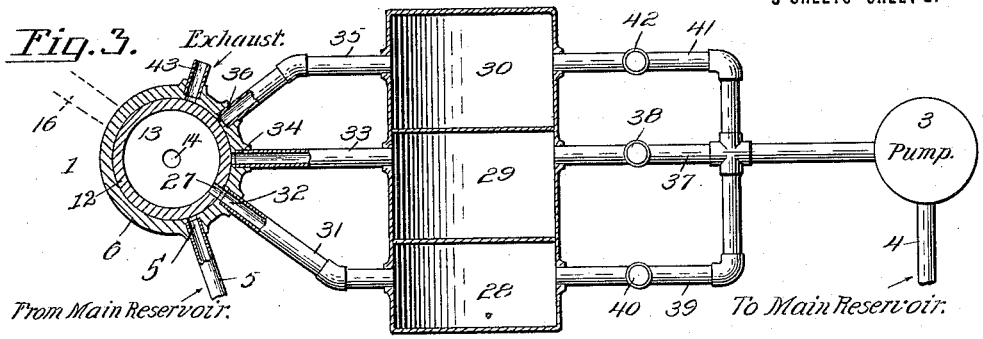
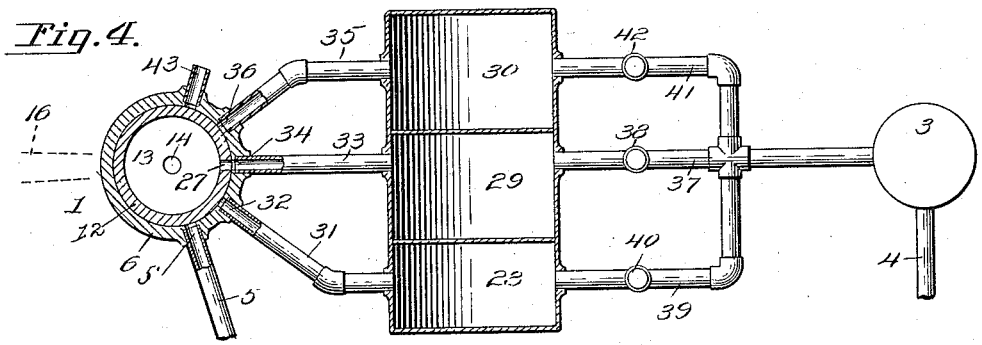
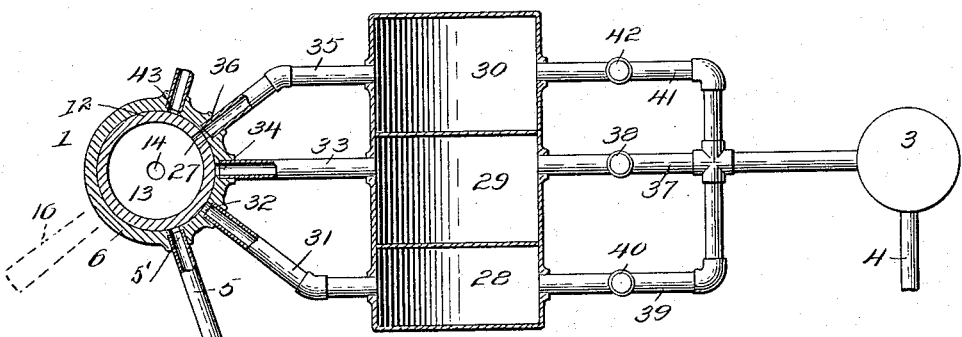

W. G. CANION.
ECONOMY AIR BRAKE APPARATUS.
APPLICATION FILED DEC. 2, 1913.
1,149,152.
Patented Aug. 3, 1915.
3 SHEETS—SHEET 3.
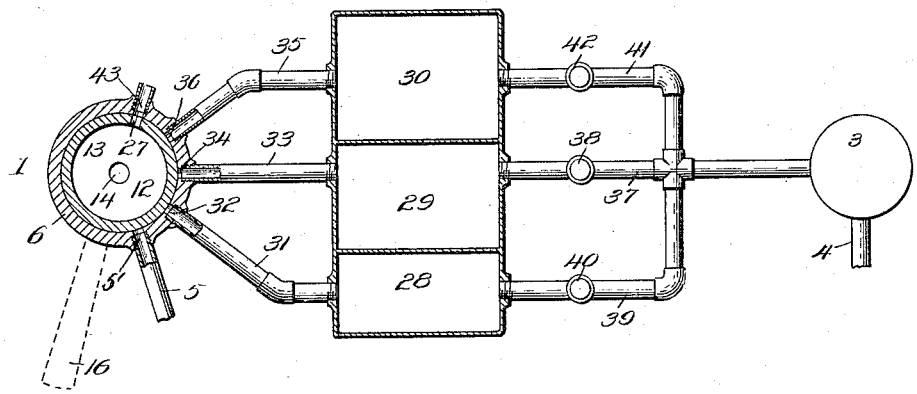
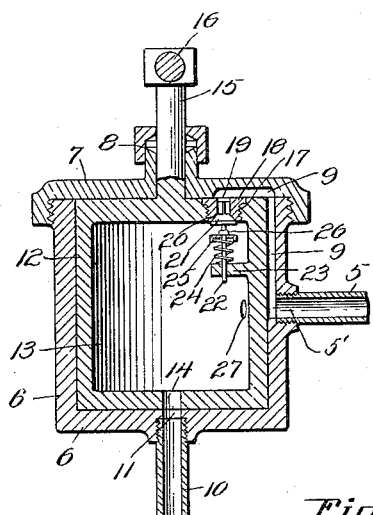
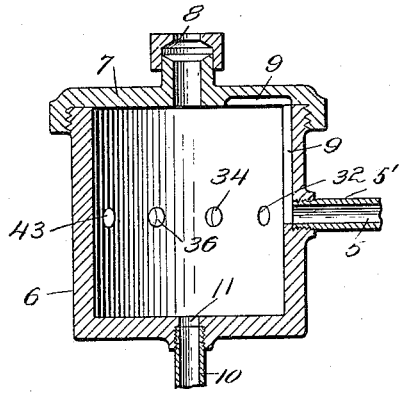
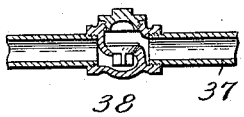
Witnesses
F. L. Gibson
J. W. Garner
Inventor
William G. Canion.
By Victor J. Evans
Attorney

UNITED STATES PATENT OFFICE.

WILLIAM G. CANION, OF EL PASO, TEXAS, ASSIGNOR TO ARIZONA AUTOMATIC-AIR ASSOCIATION, OF BISBEE, ARIZONA, A CORPORATION OF ARIZONA.

ECONOMY AIR-BRAKE APPARATUS.

1,149,152.  Specification of Letters Patent.  Patented Aug. 3, 1915.

Application filed December 2, 1913. Serial No. 804,248.

*To all whom it may concern:*

Be it known that I, WILLIAM G. CANION, a citizen of the United States, residing at El Paso, in the county of El Paso and State of Texas, have invented new and useful Improvements in Economy Air-Brake Apparatus, of which the following is a specification.

This invention relates to improvements in air brake apparatus for railway cars, the object of the invention being to provide improved apparatus of this character by means of which an economy of compressed air may be effected, the labor of and power for operating the air compressing pump may be reduced, and by means of which the brakes may be quickly set or released.

Another object is to effect improvements in the construction of the engineer's valve and to combine therewith and with the main reservoir and supply or compressing pump, and one or more economy reservoirs, the said valve being adapted to establish communication between the main reservoir and the train line, or between the train line and any one of the economy reservoirs and between the train line and the atmosphere at will.

The invention consists in the construction, combination and arrangement of devices hereinafter described and claimed.

In the accompanying drawings: Figure 1 is a side elevation of economy air brake apparatus constructed in accordance with my invention. Fig. 2 is a horizontal sectional view of the same with the engineer's valve set in running or brake release position. Fig. 3 is a similar view of the same, omitting the main reservoir, and showing the engineer's valve in initial brake setting position, to establish communication between the train line and the first economy reservoir. Fig. 4 is a similar view of the same, showing the engineer's valve in another brake setting position and establishing communication between the train line and the second economy reservoir. Fig. 5 is a similar view of the same, showing the engineer's valve in another brake setting position and establishing communication between the train line and the third economy reservoir. Fig. 6 is a similar view showing the engineer's valve, in emergency brake setting position, establishing communication between the train line and the outer atmosphere. Fig. 7 is a detail sectional view of the engineer's valve. Fig. 8 is a similar view of the casing of the engineer's valve, with the hollow cylindrical plug removed. Fig. 9 is a detail sectional view of one of the section valves.

My improved economy air brake apparatus is for use in connection with air brake apparatus of the usual type or of any suitable construction and in which the brakes are applied by a piston operating in a cylinder, in which, while the train is running compressed air is maintained at equal pressure in the ends of the brake cylinder, and in which the piston is operated by reducing pressure in one end of the cylinder.

For the purposes of this specification an engineer's valve is indicated at 1, a main reservoir at 2 and a supply or air compressing pump is indicated at 3 for supplying the main reservoir with compressed air. A pipe 4 leads from the pump to the main reservoir. A pipe 5 connects the main reservoir to a port 5' in the casing 6 of the engineer's valve. This casing is cylindrical in form and has a removable head 7 which is here shown as screwed thereon and the head is provided with a stuffing box 8. The casing and its head are provided with a bypass duct 9 which leads from the pipe 5 to a point in the upper end of the casing. The train line or reduction pipe 10 which is connected to the usual air brake apparatus is also connected to the bottom of the valve casing and communicates therewith through a port 11.

The valve plug 12 which is mounted for revolution and snugly fitted in the casing is cylindrical and hollow so that a chamber 13 is formed therein. This hollow cylindrical valve plug is closed at its upper and lower ends. Its bottom is provided with a central port 14 which registers with the port 11 so that the chamber 13 is always in communication with the train line. The valve plug has a centrally arranged upwardly extending stem 15 which passes through the stuffing box 8 and is provided with a handle or lever 16 by means of which the valve plug may be turned. In the top or upper head of the hollow valve plug is a threaded opening 17 in which a plug 18 is screwed, said plug having a duct 19 and being provided at its lower end with a seat 20, for a conical reducing valve 21, the said valve having a depending stem 22 guided in a vertical opening in a lug or arm 23 which the valve plug 12 is provided with and a spring 24 being employed to normally close said valve against the seat 20, this spring being here shown as a coiled spring, and the valve stem being shown as provided with a washer 25 which bears on the upper end of said spring and with an adjusting nut 26 above the washer and by means of which the tension of the spring may be varied. In the wall of the hollow valve plug 12 is a port 27. I also, in accordance with my invention, provide one or more economy reservoirs, to receive the compressed air reduced from the brake cylinder when applying the brakes, and enabling such compressed air to be reused and thus prevented from being wasted into the outer atmosphere. Any suitable number of such economy reservoirs may be employed. I here show three of such economy reservoirs, having a common body, the first economy reservoir being indicated at 28, the second at 29 and the third at 30. A pipe 31 connects the first economy reservoir 28 to a port 32 in the wall of the valve casing 6. A pipe 33 connects the second economy reservoir 29 to a port 34 in said valve casing and a pipe 35 connects the third economy reservoir 30 to a port 36 in said valve casing. A pipe 37 leads from the second economy reservoir 29 to the pump 3 and has a check valve 38 to close against back pressure. A branch pipe 39 connects the first economy reservoir 28 to said pipe 37 at a point between the check valve 38 and the pump and said pipe 39 has a check valve 40 to close against back pressure. A branch pipe 41 also connects the third economy reservoir 30 to the pipe 37 and has a check valve 42. The valve casing 6 has a port 43 to discharge into the atmosphere. The valve plug 12 may be turned to cause its port 27 to register either with the pipe 5 which leads from the main reservoir or with any of the ports 32—34—36 and 43, so that the engineer's valve is adapted to establish communication at will between the main reservoir and the train line or between the train line and any one of the economy reservoirs or between the train line and the atmosphere.

In practice the main reservoir 2 will be kept charged by the pump 3 with compressed air at the pressure of 90 pounds to the square inch. When the train is running and the brakes are in release position the engineer's valve will be set with its port 27 between and cut off from both of the ports 5'—32. This arranges the valve duct 19 in registry with the bypass duct 9 so that communication will be established between the main reservoir and the train line through the pipe 5, bypass duct 9, valve duct 19, the chamber 13 of the valve plug 12 and the ports 14—11, and hence the train line and the air brake apparatus will be charged with compressed air at 70 pounds, the spring 24 closing the valve 20 against its seat in the port or duct 19 at such pressure.

To set the brakes, under ordinary conditions, the engineer's valve is turned to a position shown in Fig. 3 so that the port 27 is caused to register with the port 32 and thus cut off communication between the main reservoir and the train line, the duct or port 19 having moved out of line with the bypass duct 9 and established communication between the train line and the first economy reservoir 28. The capacity of such reservoir is such that a 5 pound reduction is effected in the brake cylinders, which is sufficient to apply the brakes, and said economy reservoir becomes charged with compressed air at a pressure of 65 pounds and this compressed air, which in ordinary air brake apparatus is lost by being discharged into the atmosphere, is conserved by my improved apparatus. If at any time it be desired to increase the pressure on the brakes, the engineer's valve should be turned to the position indicated in Fig. 4 with its port 27 in registry with the port 34 so as to establish communication between the train line and the second reservoir 29. The capacity of the second economy reservoir 29 is such that it effects a further reduction through the train line of 20 pounds and the second economy reservoir 29 becomes charged with compressed air at the pressure of 45 pounds. If a still further degree of pressure on the brakes is desired the engineer's valve should be turned to the position shown in Fig. 5 with the port 27 in registry with the port 36, thus establishing communication between the train line and the third economy reservoir 30. The capacity of the third reservoir 30 is such as to cause the same to effect a reduction of pressure in the braking ends of the brake cylinder to 50 pounds, the said third economy reservoir becoming charged with compressed air through the train line at a pressure of 20 pounds.

In practice the pump 3 is operated intermittently as required and before taking in air from the outer atmosphere it takes in compressed air from the economy reservoirs through the connections hereinbefore described so that the compressed air which is conserved by the economy reservoir is reintroduced into the main reservoir by the operation of the pump 3 and thus the labor of the pump and the power required to operate the same are greatly reduced and a very considerable economy is effected. Moreover my air brake apparatus enables the brakes to be applied progressively so as to avoid jolting and jarring of the car or train and yet enables the brakes to be applied very rapidly.

In emergency the engineer's valve should be turned to the position shown in Fig. 6 to cause the port 27 of the plug 12 to register with the outer air port 43 of the casing and thus establish communication directly between the train line and the outer air. To release the brakes by recharging the brake apparatus, the engineer's valve should be turned in the reverse direction to cause the port 27 to successively register with the ports 36—34—32 and finally with the port 5' or pipe 5 and reëstablish communication between the train line and the main reservoir.

While I have herein shown and described a preferred form of my invention I would have it understood that changes may be made in the form, proportion and construction of the several parts without departing from the spirit of my invention and within the scope of the appended claims.

Having thus described my invention, I claim:—

1. In brake apparatus of the class described, the combination of a main reservoir, a supply pump therefor, a plurality of economy reservoirs, and a valve to establish communication between the main reservoir and the train line, or between the train line and any one of the economy reservoirs at will.

2. In air brake apparatus of the class described the combination of a main reservoir, a supply pump therefor, and a plurality of economy reservoirs of varying capacity, and a valve to establish communication between the main reservoir and the train line or between the train line and any one of the economy reservoirs at will.

3. In air brake apparatus of the class described the combination of a main reservoir, a supply pump therefor, a plurality of economy reservoirs, and a valve to establish communication between the main reservoir and the train line, or between the train line and any one of the economy reservoirs or between the train line and the outer air at will.

4. In air brake apparatus of the class described, a valve to establish communication between the main reservoir and the train line or between the train line and the economy reservoir at will, said valve having pressure reducing means, and comprising a casing connected directly to the train line and having a port connected to the main reservoir and a bypass duct leading from said port, said valve casing also having a port connected to the economy reservoir, and a movable hollow valve plug in the casing, having a port in constant communication with the train line, a port movable into communication either with the main reservoir port or the economy reservoir port at will, and also having a valved port movable into and out of registry with the said bypass duct.

5. In air brake apparatus of the class described, a valve to establish communication between the main reservoir and the train line or between the train line and the economy reservoir at will, said valve having pressure reducing means, and comprising a casing connected directly to the train line and having a port connected to the main reservoir and a bypass duct leading from said port, said valve casing also having a port connected to the economy reservoir, and a movable hollow valve plug in the casing, having a port in constant communication with the train line, a port movable into communication either with the main reservoir port or the economy reservoir port at will, and also having a valved port movable into and out of registry with the said bypass duct, and a spring to close the valve in said valved port at predetermined pressure.

6. In air brake apparatus of the class described, a valve to establish communication between the main reservoir and the train line or between the train line and the economy reservoir at will, said valve having pressure reducing means, and comprising a casing connected directly to the train line and having a port connected to the main reservoir and a bypass duct leading from said port, said valve casing also having a port connected to the economy reservoir, and a movable hollow valve plug in the casing, having a port in constant communication with the train line, a port movable into communication either with the main reservoir port or the economy reservoir port at will, and also having a valved port movable into and out of registry with the said bypass duct, and a spring to close the valve in said valved port at predetermined pressure, and means to vary the tension of said spring.

In testimony whereof I affix my signature in presence of two witnesses.

WILLIAM G. CANION.

Witnesses:
J. W. GARNER,
ROBT. STORMER.